(12) United States Patent
Schmidt et al.

(10) Patent No.: US 7,932,816 B2
(45) Date of Patent: Apr. 26, 2011

(54) DEVICE FOR DETECTING AND DISPLAYING THE POSITION OF COMPONENTS OF VEHICLE COUPLINGS

(75) Inventors: Dirk Schmidt, Königstein (DE); Swen Saupe, Mainz (DE); Achim Strütt, Riedstadt (DE); José Manuel Algüera Gallego, Aschaffenburg (DE)

(73) Assignee: Jost-Werke GmbH, Neu-Isenburg (DE)

( * ) Notice: Subject to any disclaimer, the term of this patent is extended or adjusted under 35 U.S.C. 154(b) by 416 days.

(21) Appl. No.: 11/887,032

(22) PCT Filed: Mar. 21, 2006

(86) PCT No.: PCT/EP2006/002555
§ 371 (c)(1),
(2), (4) Date: Jan. 22, 2008

(87) PCT Pub. No.: WO2006/100025
PCT Pub. Date: Sep. 28, 2006

(65) Prior Publication Data
US 2008/0150745 A1    Jun. 26, 2008

(30) Foreign Application Priority Data
Mar. 24, 2005   (DE) .......................... 10 2005 014 977

(51) Int. Cl.
G08B 21/00 (2006.01)
(52) U.S. Cl. ...................................................... 340/431
(58) Field of Classification Search ............... 340/686.1, 340/431, 686.2, 686.6, 687, 691.6; 307/9.1; 280/433
See application file for complete search history.

(56) References Cited

U.S. PATENT DOCUMENTS

| | | | |
|---|---|---|---|
| 3,868,127 A | | 2/1975 | Marulic et al. |
| 5,477,207 A | * | 12/1995 | Frame et al. .................. 340/431 |
| 5,617,072 A | | 4/1997 | McNeal |
| 5,861,802 A | * | 1/1999 | Hungerink et al. ........... 340/431 |
| 6,011,492 A | * | 1/2000 | Garesche ....................... 340/904 |
| 6,095,544 A | | 8/2000 | Flater |
| 6,100,794 A | * | 8/2000 | Hillier ........................... 340/431 |
| 6,222,457 B1 | * | 4/2001 | Mills et al. ................. 340/686.1 |
| 6,285,278 B1 | * | 9/2001 | Schutt et al. .................. 340/431 |

(Continued)

FOREIGN PATENT DOCUMENTS

DE        297 22 370 U1     5/1998

(Continued)

OTHER PUBLICATIONS

Response to Office Action filed Mar. 16, 2010 in co-pending U.S. Appl. No. 11/992,843 with relevant Office Action of Dec. 16, 2009.

(Continued)

Primary Examiner — Phung Nguyen
(74) Attorney, Agent, or Firm — Flaster/Greenberg P.C.

(57) ABSTRACT

The invention relates to a device for detecting and displaying the position of components of vehicle couplings, in particular semi-trailer couplings. A combined sensor and display unit is located in a common housing. The sensor unit comprises at least one sensor and the display unit at least one display element. The device can be mounted on the exterior of a semi-trailer coupling or of a sliding unit of a semi-trailer coupling, adjacent to a manual actuating element of a closing or locking device.

17 Claims, 10 Drawing Sheets

U.S. PATENT DOCUMENTS

Figure 1:
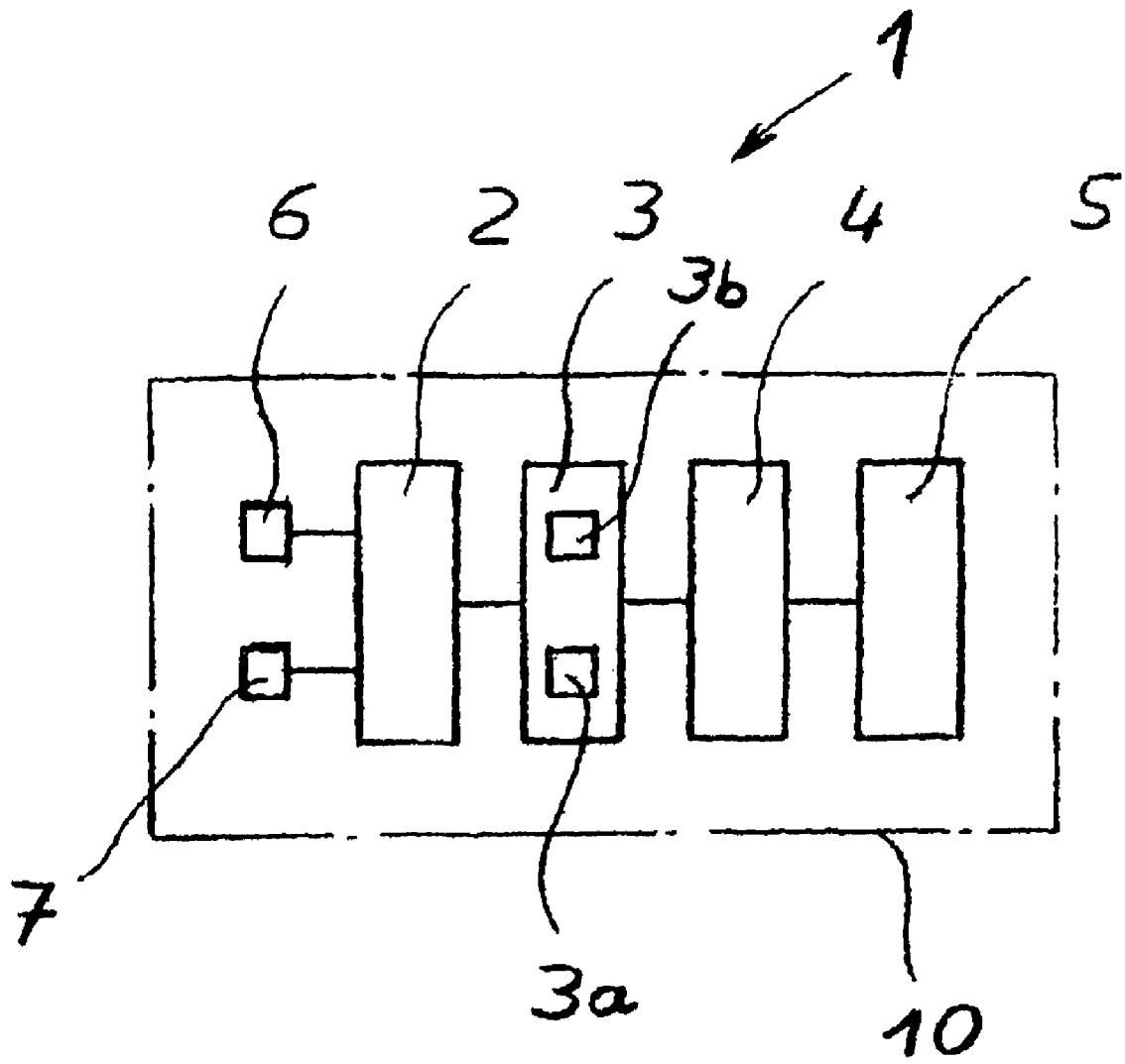

| | | | |
|---|---|---|---|
| 6,452,485 B1 * | 9/2002 | Schutt et al. | 340/431 |
| 6,736,420 B2 | 5/2004 | Laarman et al. | |
| 6,866,283 B2 | 3/2005 | Algüera | |
| 7,825,783 B2 | 11/2010 | Gallego et al. | |
| 2001/0022731 A1 * | 9/2001 | Dupay | 362/560 |

FOREIGN PATENT DOCUMENTS

| | | |
|---|---|---|
| DE | 198 20 139 A1 | 11/1999 |
| DE | 102 41 904 A1 | 3/2004 |
| EP | 0 509 137 A1 | 10/1992 |
| JP | 2002-331971 A | 11/2002 |

OTHER PUBLICATIONS

Notice of Allowance dated Jul. 13, 2010 in co-pending U.S. Appl. No. 11/922,843.

Supplemental Notice of Allowability dated Aug. 4, 2010 in co-pending U.S. Appl. No. 11/922,843.

Notice of Allowance in co-pending U.S. Appl. No. 11/922,843 (5 pages) Jul. 13, 2010.

* cited by examiner

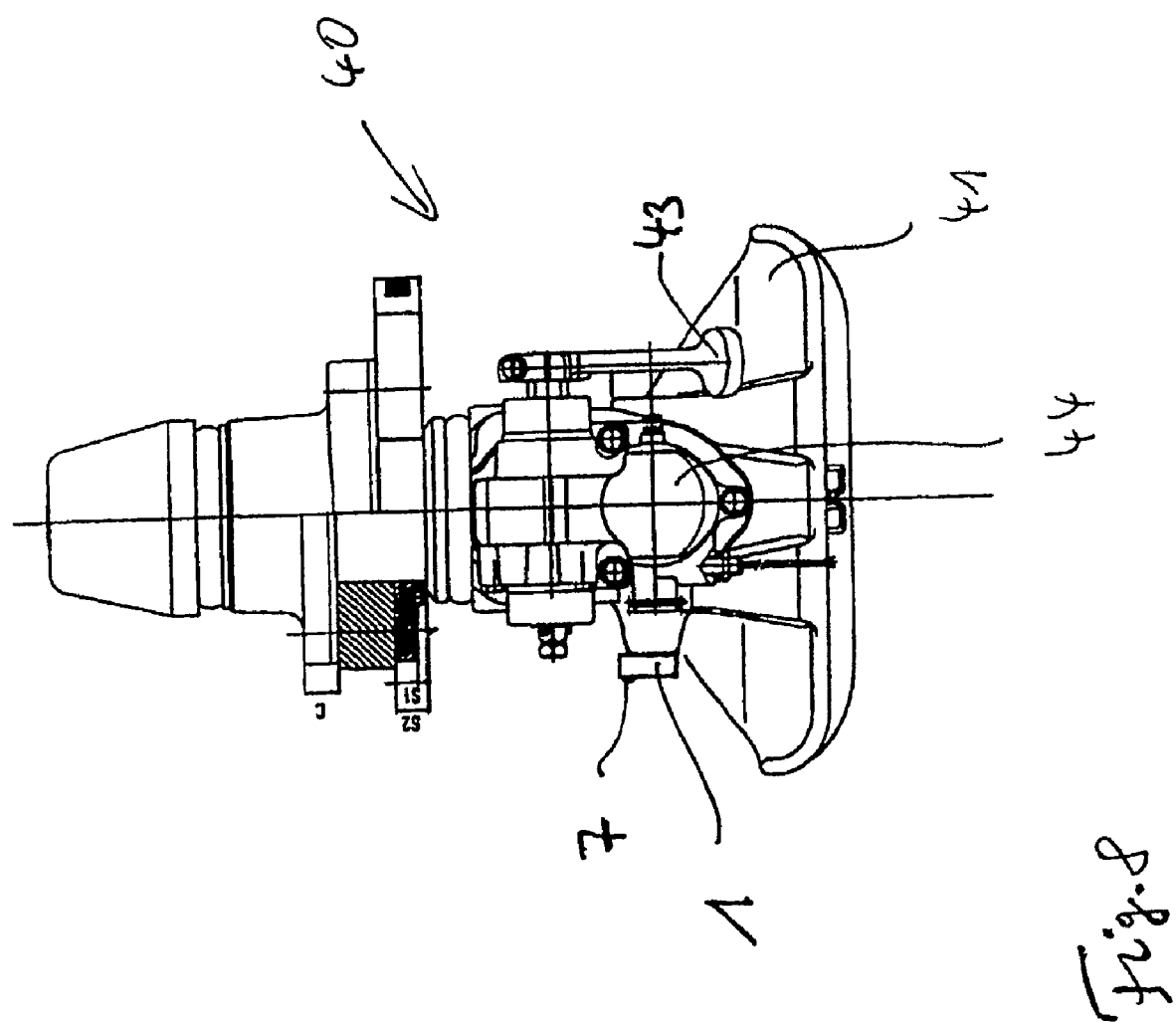

DEVICE FOR DETECTING AND DISPLAYING THE POSITION OF COMPONENTS OF VEHICLE COUPLINGS

BACKGROUND OF THE INVENTION

1. Field of the Invention

The invention relates to a device for detecting and displaying the position of components of vehicle couplings, in particular, fifth-wheel couplings. The invention also relates to an arrangement of such a device on the exterior of fifth-wheel couplings or of displacement devices of a fifth-wheel coupling.

2. Description of Related Art

From DE 102 41 904 A1, a device for displaying the closure state of a fifth-wheel coupling is known, wherein a first sensor is arranged in the area of the receptacle opening of the fifth-wheel coupling and detects the kingpin and a second sensor comprises a magnetically sensitive sensor, which interacts with a magnet mounted on an operating lever, wherein the two sensors rely on different actuating mechanisms. These sensors are connected to a display unit in the driver's cab of the semi-trailer tractor truck.

The signal transmission, as well as the power supply for the sensors, is usually realized via cable sets and the signal evaluation is realized via corresponding control electronics. The installation expense for such systems is large and often stands in poor relationship to the achieved effect, which hinders greater circulating use of these systems for desirable safety equipment.

From U.S. Pat. No. 6,736,420 B2, a displacement device for fifth-wheel couplings is known, which has two guide rails with toothed racks, on which a carriage carrying the fifth-wheel coupling is supported so that it can be displaced. A locking device with blocking parts engaging in the toothed racks is arranged on the carriage. One of the blocking parts is connected to an opening lever, which, in turn, can be connected to an actuation device, e.g., a pull lever, for manual actuation. In this known displacement device, it is also necessary for the driver to visually inspect the proper locking of the carriage before he drives away.

Independent of the presence of display devices in the driver's cab, the driver must perform a visual inspection of the vehicle, the fifth-wheel coupling, the closing device, etc. before beginning to drive.

Usually, mechanical closure displays are used, which can be easy or hard to read according to their construction and the lighting conditions. This can make the vehicle check significantly more difficult before starting the drive and in the extreme case can even lead to incorrect coupling.

Therefore, the problem of the invention is to present a device for detecting and displaying the position of components of vehicle couplings, which makes a visual inspection of these components easier.

BRIEF SUMMARY OF THE INVENTION

This problem is solved with a device, which is characterized by a combined sensor and display unit arranged in a common housing, wherein the sensor unit has at least one sensor and the display unit has at least one display element.

The advantage of the device is that a compact unit is made available, which can be placed at the location of the check and also outputs there a preferably optical or acoustic signal. Complicated wiring of the sensor unit with a display device arranged in the driver's cab is eliminated. Therefore, an economical unit is made available, which can be arranged without a problem at positions, where a check is to be performed. The visual check can be performed by the driver while passing by, without requiring the need of additional aids, e.g., flashlights, etc., in order to check; for example, the closure state of a fifth-wheel coupling or the position of a displacement device.

Preferably, the combined sensor and display unit has its own voltage source, which is preferably arranged in the housing. This measure also contributes to the universal use of the device according to the invention. Wiring to the voltage source is eliminated. Batteries, accumulators, or, e.g., electrokinetic generators can be used as the voltage source.

Preferably, the combined sensor and display unit has an electronic evaluation unit. With this evaluation unit, not only can the sensor signal be evaluated to the extent whether a closure state is present or not (yes/no signal), but such an evaluation unit also allows the state of the voltage source (e.g., accumulator or battery) to be evaluated.

Preferably, the device can also have at least one distance sensor. With a device equipped with such a distance sensor, it is possible, for example, for a fifth-wheel coupling, to check the correct position of a semi-trailer on the fifth-wheel coupling. With reference to the determined distance from the device to the bottom side of the semi-trailer, it can be determined whether this is located in the prescribed position, in which the kingpin engages in the closing device of the fifth-wheel coupling.

The sensors can be inductive sensors, magnetic sensors, force sensors, pressure sensors, or reed sensors. Preferably, the sensors operate using a contact-less method, wherein electromagnetic sensors are preferred.

According to the location of use, the sensor can also have a switch element, in particular, a mechanical switch element. Such a construction is preferred, for example, in the use of the device according to the invention on bolt couplings.

The display unit preferably has an optical display element arranged on the housing. This can be, e.g., a lamp, especially an LED display. Here, it is preferred when this optical display element is arranged on the housing, such that it can be read without a problem by the driver when he walks by according to the position of the device on the vehicle.

The display unit can have exclusively or additionally an acoustic display element and/or a mechanical display element. Mechanical display elements can be direction indicators, pins, or the like. Beepers or buzzers are preferred for the acoustic display elements. The display on the display element can be continuous, for example, by means of a continuous light or continuous tone. The display, however, can also be not continuous and can be, e.g., in the form of a blinking light or the like.

It is provided, in particular, to display the closure state, e.g., of a fifth-wheel coupling, by an optical or acoustic signal. It can also be preferred to display the open position according to a signal. The sort of display that is selected depends on the sort of position to be detected for the vehicle components and/or on their arrangement on the vehicle.

The arrangement according to the invention of the described device provides that the device is arranged on the exterior of a fifth-wheel coupling or of a displacement device of a fifth-wheel coupling and adjacent to a manual actuation element of a closing or locking device, wherein a contact element of this type is arranged on the manual actuation element or can be actuated by the manual actuation element, so that it interacts with the sensor of the sensor unit in the closed or locked position.

The exterior of a fifth-wheel coupling or of a displacement device means a suitable location that can be seen easily from the outside, so that the display device can be easily read while walking past the vehicle. The arrangement on or in the vicinity of a manual actuation element offers the advantage that here it involves a location, which must otherwise be accessible for the driver, because he must actuate the manual actuation element, for example, for locking a fifth-wheel coupling. Such locations are easy to see, so that the device or its display device can be read there without a problem.

The manual actuation element can be a pull lever or a safety lever of a pull lever.

As the contact element, a metal plate or a magnet is preferred, which is attached to the manual actuation element. By moving the manual actuation element, this contact element moves into the area of the sensor of the device or away from the sensor, so that two different positions of the manual actuation element and thus also of the locking device connected to this element can be detected.

The contact element can also be arranged on a pivot element, which is a manual actuation element. Such a manual actuation element is used, for example, as a locking element for a pull lever, with which the closing device of a fifth-wheel coupling is actuated. The contact element interacts' with the sensor of the device when it is pivoted into the area of the sensor.

The device according to the invention can also be arranged on the exterior of a bolt coupling adjacent to the coupling bolt, which interacts with the sensor of the sensor unit in the closed position.

In this construction, the sensor has a switch element, which can be actuated by the coupling bolt. This switch element is linked with the sensor unit, such that the closure state of the bolt coupling can be determined from the position of the switch element.

Another arrangement of the device provides the attachment to the exterior of a displacement device, which has a toothed rack and blocking parts on a carriage carrying a fifth-wheel coupling, and adjacent to a blocking part, which interacts in the locked position with the sensor of the sensor unit. It is possible with the device to display the exact position of the displacement device, i.e., of the carriage, on site and in position. For this purpose, the display device can have several display elements or also a digital or analog display, which gives the position, for example, in centimeters from a fixed point.

BRIEF DESCRIPTION OF THE SEVERAL VIEWS OF THE DRAWING(S)

Figure 2:
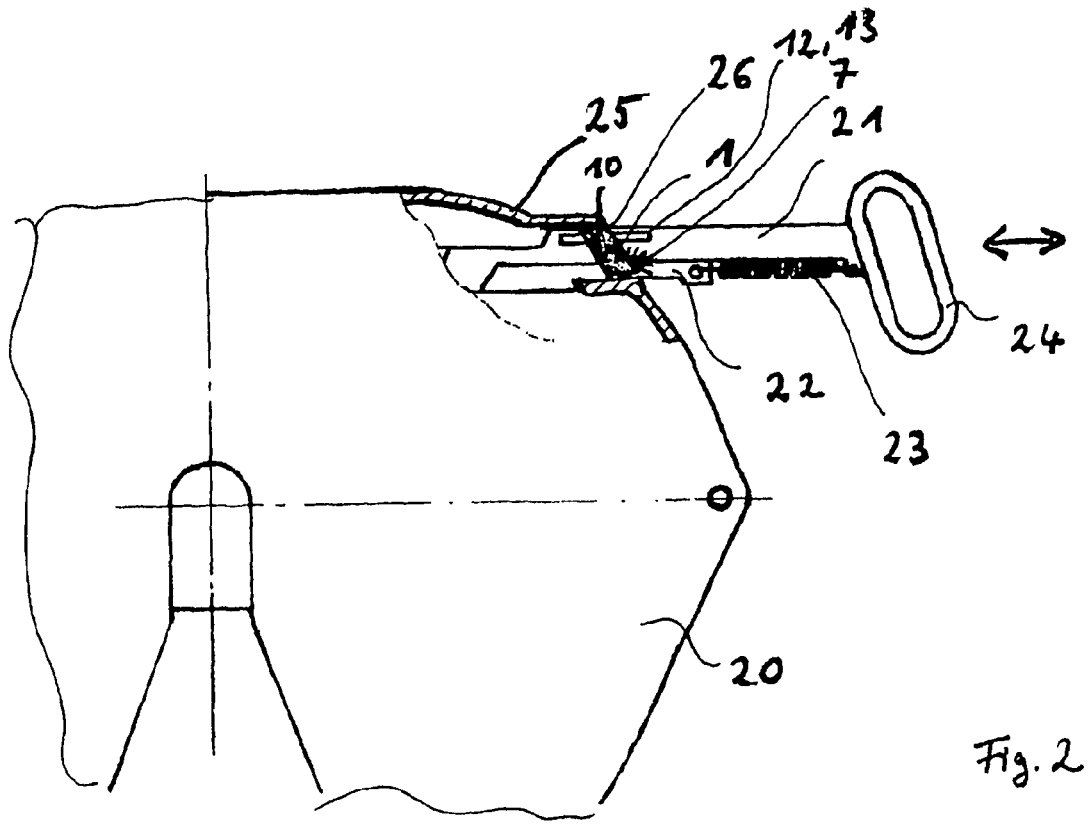
Figure 4:
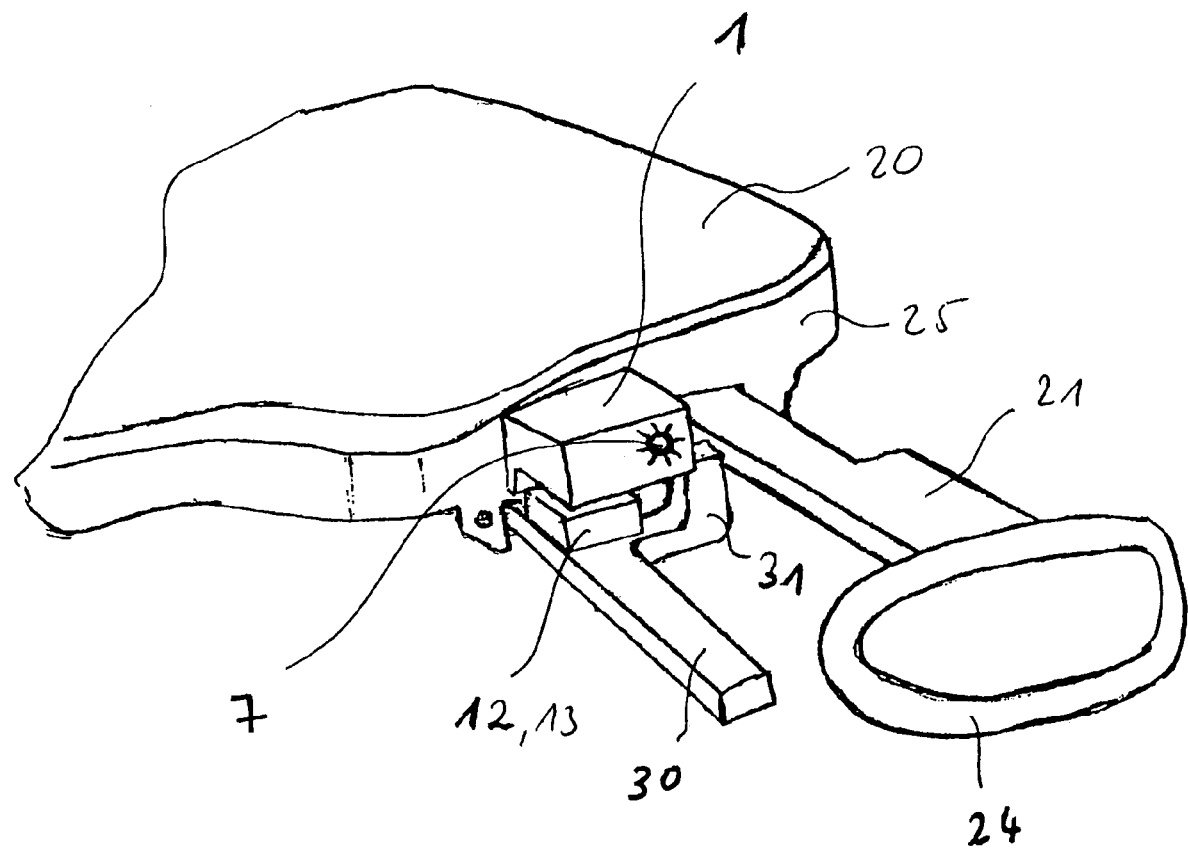
Figure 6:
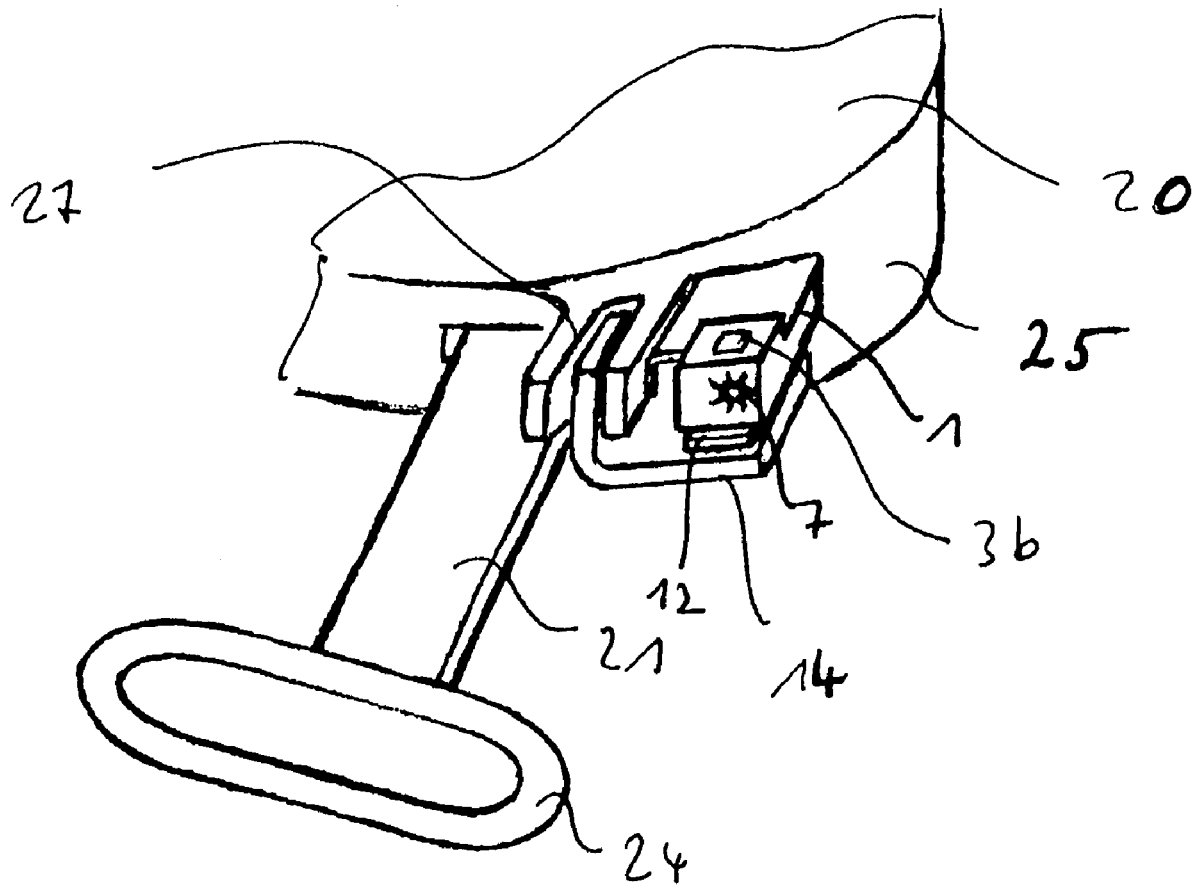
Figures 9A, 9B:
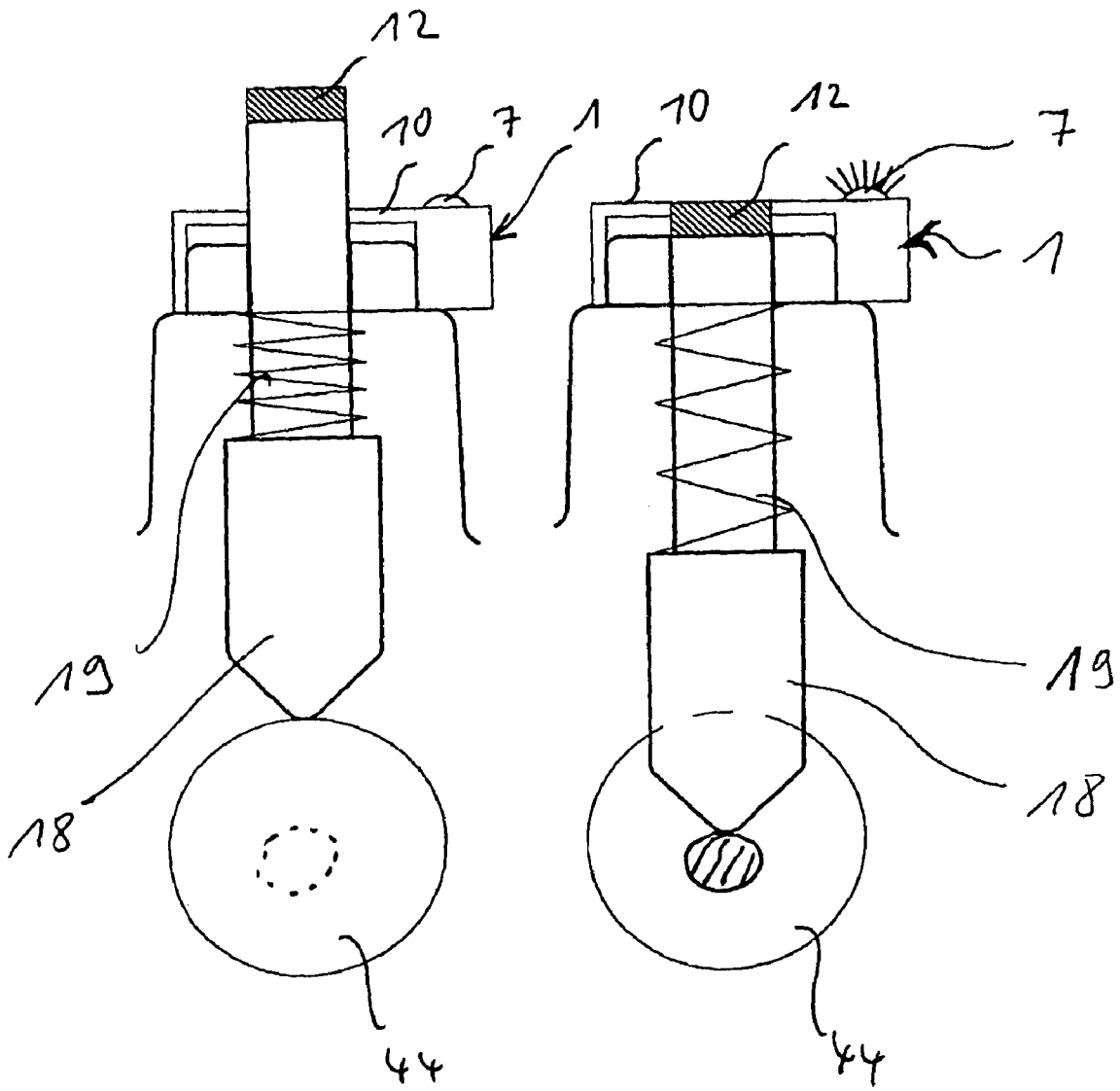
Figure 10:
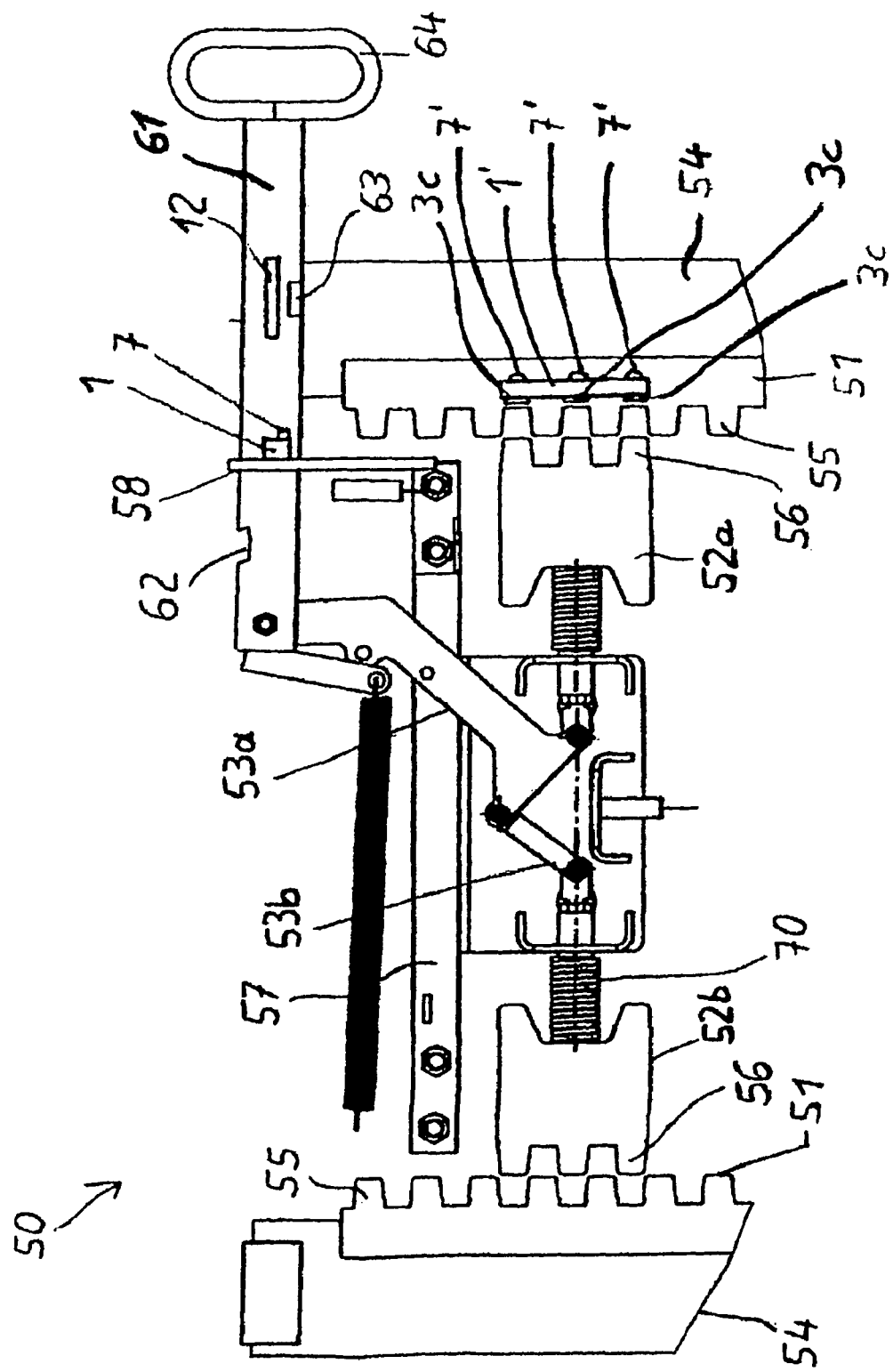

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 1 a schematic view of the device according to the invention,

FIGS. 2+3 the arrangement of the device according to the invention on a fifth-wheel coupling according to a first embodiment, FIGS. 4+5 the arrangement of the device according to the invention on a fifth-wheel coupling according to a second embodiment, FIGS. 6+7 the arrangement on a fifth-wheel coupling according to a third embodiment, FIG. 8 the arrangement of the device on a bolt coupling, FIGS. 9a+9b an enlarged schematic view of the device on a bolt coupling, FIGS. 10+11 the arrangement of the device according to the invention on a displacement device.

DETAILED DESCRIPTION OF THE INVENTION

In FIG. 1, the device 1 according to the invention is shown schematically. A housing 10 shown with dashed lines accommodates a sensor unit 3 with sensors 3a, 3b, a display unit 2, an evaluation unit 4, a voltage source 5, and display elements 6 and 7, which are connected to the display unit 2. All of the units are connected to the voltage source 5 and also partially connected to each other, which is shown only schematically in FIG. 1. The shown device 1 contains both an acoustic display element 6 and also an optical display element 7.

In FIG. 2, the arrangement of such a device 1 on a fifth-wheel coupling 20 is shown. The side wall 25 of a coupling plate has a passage opening 26, in order to lead the pull lever 21 to the outside. This pull lever 21 is connected via a rod assembly to a closing device for the kingpin; which cannot be seen in the view shown here.

The pull lever 21 has a handle 24, with which the pull lever can be moved in the direction of the arrow. A safety lever 22, which also extends outwardly through the opening 26 and which is connected by means of a spring 23 in the area of the handle 24, is arranged adjacent to the pull lever 21.

The device 1 is arranged in the passage opening 26, wherein the sensor of the device 1 is provided on the bottom side of the housing 10 and therefore is not visible. Because the pull lever 21 is located under the device 1, this preferably has on its top side a contact element 12 in the form of a metal plate 13. Instead of a metal plate, a magnet can also be used. In FIG. 2, this metal plate is located under the sensor. This is the position, in which the closing device is located in the closed position and the pull lever 21 is located in its safety position.

By pulling out the pull lever 21, this lever is moved into a position that allows the pull lever to also be displaced laterally and to open the closing device of the kingpin. In this way, the contact element 12 moves away from the device 1 and thus from the sensor, which can be indicated by the display device.

Figure 3:
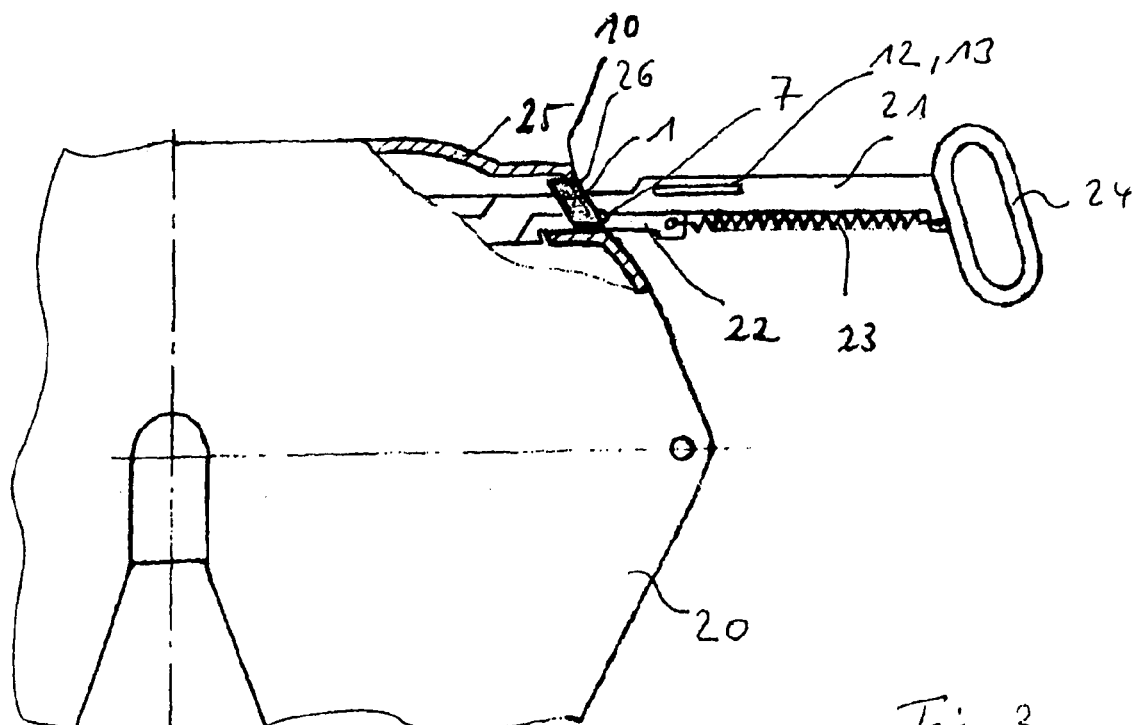

In FIGS. 2 and 3, it is provided that the display device has an optical display element 7, which is illuminated when the closed position is set (FIG. 2) and is turned off when the pull lever is moved into the open position (FIG. 3). The optical display element 7 is mounted on the housing 10 on the side and thus can be seen from the operating side.

Figure 5:
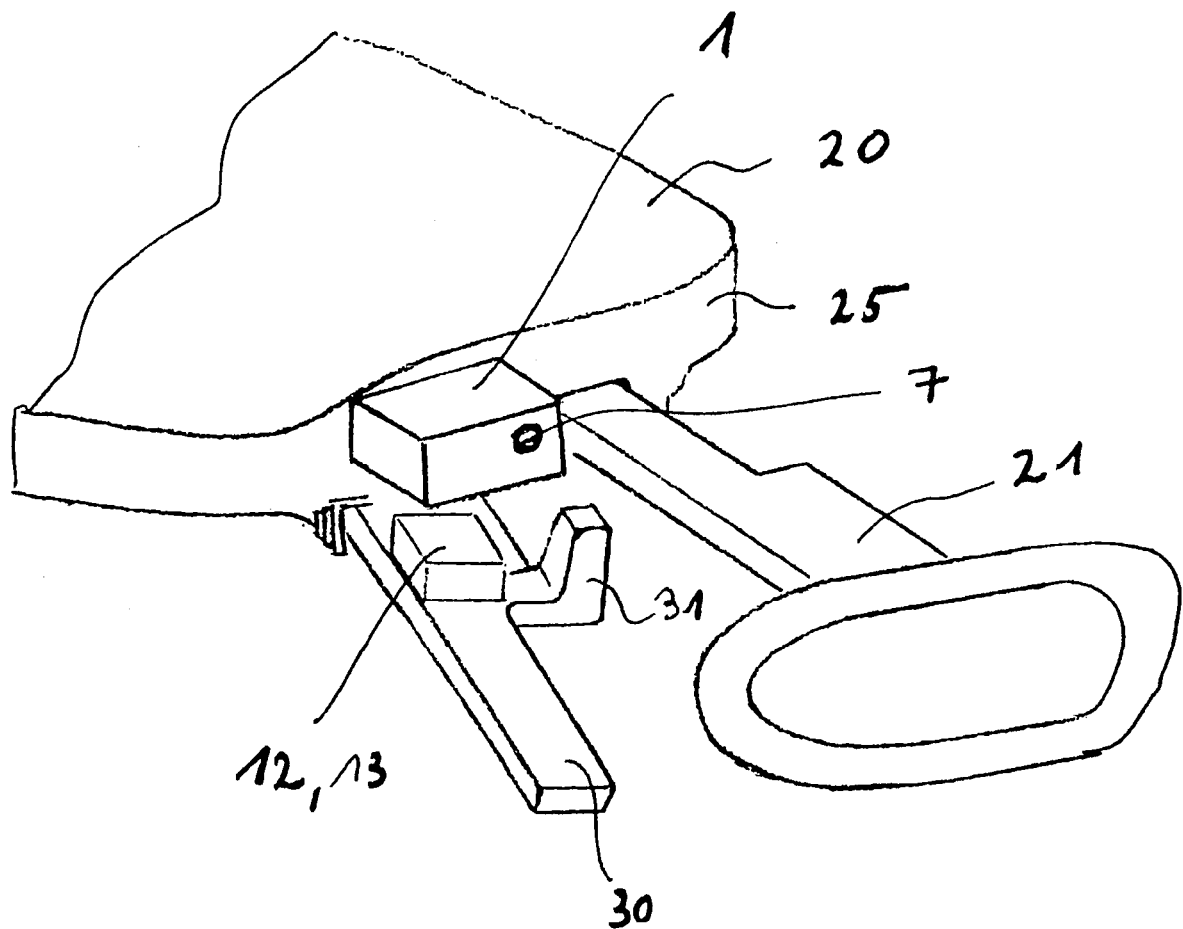

In FIG. 4 another embodiment is shown. In this construction, the device 1 is also arranged on the peripheral wall 25 on the fifth-wheel coupling plate 20. The safety lever 30 is a separate lever, which is not connected to the pull lever 21. On the top side of the safety lever 30, the contact element 12 is also arranged in the form of a metal plate 13. Before the pull lever 21 can be moved, the safety lever 30 must first be shifted, as shown in FIG. 5. Only then is it possible to move the pull lever 21 for opening the closing device over the safety hook 31 on the safety lever 30.

Figure 7:
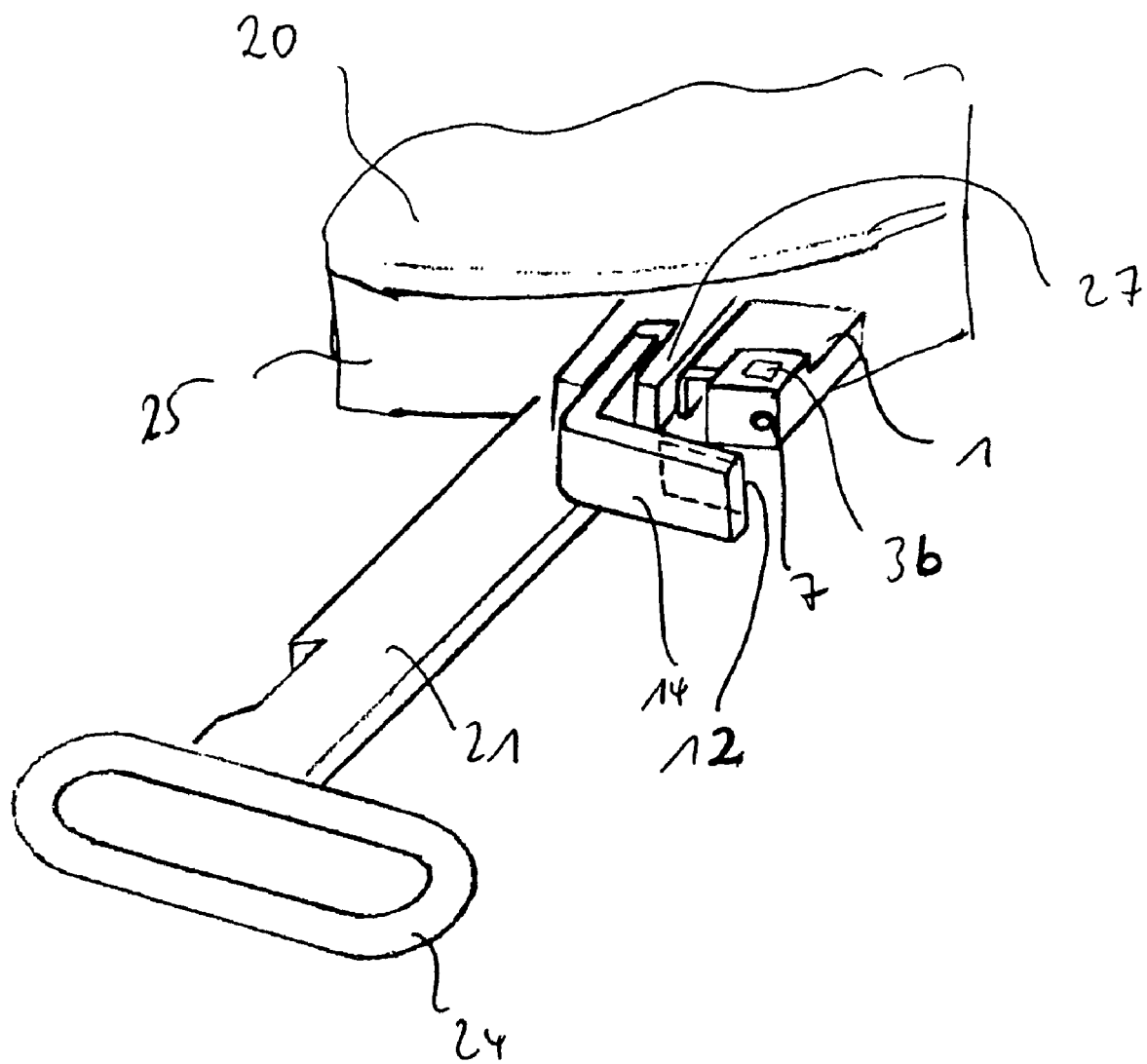

In FIGS. 6 and 7, another embodiment is shown. On the peripheral wall 25 of the fifth-wheel coupling 20, a pivot bearing 27 is provided, in which a pivot lever 14 is supported with a contact element 12 mounted on this pivot lever and thus secures the pull lever 21. The device 1 according to the invention, which has a sensor on the bottom side, is arranged above the pivot lever 14. In the position shown in FIG. 6, the pull lever 21 and thus the closing device is located in the closed position. Accordingly, the optical display 7 is illuminated.

Before the pull lever 21 can be moved for opening the closure, the pivot lever 14 must be pivoted in the pivot bearing 27 by 90°, so that the concerned leg of the pivot lever is moved away from the sensor of the sensor unit of the device 1. The device 1 therefore recognizes the open position and the display element 7 is turned off.

Furthermore, in FIGS. 6 and 7, a distance sensor 3b is to be seen, which is arranged on the top side of the housing and which detects the distance to a coupled semi-trailer (not shown).

In FIG. 8, a bolt coupling 40 is shown, which has a coupling housing 41, into which the front end, for example, of a drawbar, can be introduced. In the housing there is an opening for the coupling bolt 44, which can be shifted in the perpendicular direction. The lever 43 is provided for this purpose.

The device 1 according to the invention is arranged with the display element 7 on the left side of the coupling housing 41. The function is shown in FIGS. 9a and 9b.

The device 1 has a mechanical switch element in the form of a safety bolt 18 with the contact element 12 on its free end, which is arranged spring-mounted on the housing 1 and which extends outwardly through the housing 10. FIG. 9a shows the opened position of the coupling bolt 44. FIG. 9b shows the closed position, in which the coupling bolt 44 is shifted relative to the safety bolt 18, so that the safety bolt 18, driven by the pressure spring 19, is lowered into a recess in the coupling bolt 44. The corresponding position can be recognized, besides with reference to the optical display element 7, also with reference to the position of the safety bolt 18, as a comparison of FIGS. 9a and 9b shows. Therefore, it is possible to detect the locked position of the coupling bolt 44.

Figure 11:
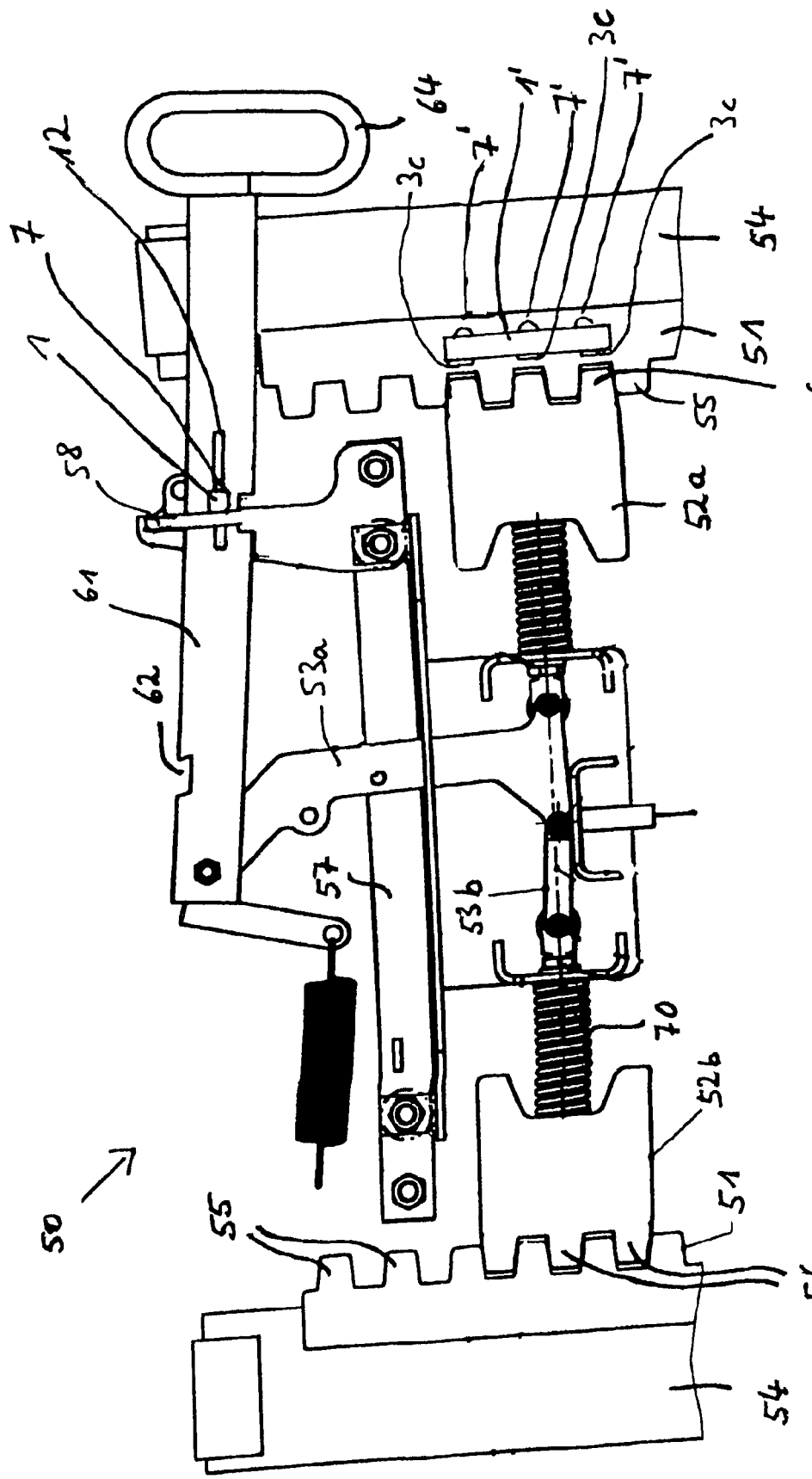

In FIGS. 10 and 11, a displacement device 50 is shown. Guide rails 54 with toothed racks 51 and teeth 55 arranged parallel to each other are mounted on a tractor truck (not shown). The teeth 55 are arranged pointing inward and lie in a common plane.

A carriage 70, whose frame is not shown in FIGS. 10 and 11, is displaceably arranged on the guide rails 54.

On the carriage, a locking device with blocking parts 52a, b is arranged, which are connected to a pull lever 61 via levers 53a, b. By means of the pull lever 61, these blocking parts 52a, b are shifted from an unlocked position (FIG. 10) into a locked position (FIG. 11) and vice versa. The device 1 according to the invention is arranged on a wall element 58, through which the pull lever 61 is guided. A contact element 12 is arranged on the top side of the pull lever 61. In FIG. 10, which shows the unlocked position, the pull lever 61 is fixed with its catch recess 62 on the wall element 58. The contact plate 12 is arranged outside of the device 1, so that the device 1 detects the unlocked position.

When the pull lever 61 is pushed in, as shown in FIG. 11, and the blocking parts 52a, b assume their locked position, the contact element 12 is moved under the device 1, so that this device can detect the locked position with the sensor unit. A corresponding signal is displayed via the optical display 7.

In FIGS. 10 and 11, a device 1', which has three position sensors 3c on the inside and three optical displays 7' on the outside, is arranged on the toothed rack 51. When the teeth 56 of the blocking part 52a engage in the gaps between the teeth 55 of the toothed rack 51, this is detected by the position sensors 3c. When the carriage 70 is shifted, the position of the blocking parts 52a, b changes, so that not all of the teeth 56 of the blocking part 52a lie opposite a position sensor 3c. The optical display elements 7' are illuminated according to whether only one sensor 3c or two or all three sensors 3c detect teeth 56. When walking past, the driver can recognize in which position the carriage of the displacement device is located with reference to the number of illuminated display elements.

LIST OF REFERENCE SYMBOLS

1, 1' Device
2 Display unit
3 Sensor unit
3a Sensor
3b Sensor (distance sensor)
3c Sensor (position sensor)
4 Evaluation unit
5 Voltage source
6 Acoustic display element
7 Optical display element
10 Housing
12 Contact element
13 Metal plate
14 Pivot element
17 Switch element
18 Safety bolt
19 Pressure spring
20 Fifth-wheel coupling
21 Pull lever
22 Safety lever
23 Spring
24 Handle
25 Peripheral wall
26 Opening
27 Pivot bearing
30 Safety lever
31 Safety hook
40 Bolt coupling
41 Coupling housing
43 Safety lever
44 Coupling bolt
50 Displacement device
51 Toothed rack
52a, b Blocking part
53a, b Lever
54 Guide rail
55 Tooth
56 Tooth
57 Spring
58 Wall element
61 Pull lever
62 Catch recess
63 Catch arrangement
64 Handle
66 Tooth
70 Carriage It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An arrangement of a device on an exterior of a fifth-wheel coupling or of a displacement device of a fifth-wheel coupling and adjacent to a manual actuation element of a closing or locking device, wherein the device has a combined sensor and display unit arranged in a common housing, wherein the sensor unit has at least one sensor and the display unit has at least one display element, and wherein a contact element is arranged on the manual actuation element or can be actuated by the manual actuation element, such that it interacts in a closed or locked position with the sensor of the sensor unit.

2. The arrangement according to claim 1, wherein the manual actuation element is a pull lever or a safety lever of a pull lever.

3. The arrangement according to claim 1, wherein the contact element is a metal plate or a magnet, which metal plate or magnet is fixed on the manual actuation element.

4. The arrangement according to claim 1, wherein the manual actuation element is a pivot element, on which the contact element is arranged.

5. An arrangement of a device on the exterior of a bolt coupling adjacent to the coupling bolt, which interacts in the closed position with the sensor of the sensor unit, wherein the device has a combined sensor and display unit arranged in a common housing, wherein the sensor unit has at least one sensor and the display unit has at least one display element and wherein the sensor has a switch element, which can be actuated by the coupling bolt.

6. The device according to claim 5, wherein the combined sensor and display unit has a separate voltage source.

7. The device according to claim 6, wherein the voltage source is arranged in the housing.

8. The device according to claim 5, wherein the combined sensor and display unit has an electronic evaluation unit.

9. The device according to claim 5, wherein at least one distance sensor is provided.

10. The device according to claim 5, wherein the sensor operates using a contact-less method.

11. The device according to claim 5, wherein the sensor is an electromagnetic sensor.

12. The device according to claim 5, wherein the sensor has a switch element.

13. The device according to claim 5, wherein the display unit has an optical display element arranged on the housing.

14. The device according to claim 5, wherein the display unit has an acoustic display element.

15. The device according to claim 5, wherein the display unit has a mechanical display element.

16. An arrangement of a device on the exterior of a displacement device, which has a toothed rack and blocking parts on a carriage carrying the fifth-wheel coupling, and adjacent to a blocking part, which interacts in the locked position with the sensor of the sensor unit, wherein the device has a combined sensor and display unit-arranged in a common housing, wherein the sensor unit has at least one sensor and the display unit has at least one display element.

17. A device for detecting and displaying the position of components of vehicle couplings, in particular, of fifth-wheel couplings, wherein a combined sensor and display unit is arranged in a common housing, the sensor unit having at least one sensor and the display unit having at least one display element, and wherein the combined sensor and display unit has its own separate voltage source.

\* \* \* \* \*